UNITED STATES PATENT OFFICE.

JOSEPH C. HECKMAN, OF AVALON, PENNSYLVANIA.

FERTILIZER.

1,386,331.

No Drawing.

Specification of Letters Patent.  Patented Aug. 2, 1921.

Application filed September 24, 1920. Serial No. 412,580.

*To all whom it may concern:*

Be it known that I, JOSEPH C. HECKMAN, a citizen of the United States, and resident of Avalon, in the county of Allegheny and State of Pennsylvania, have invented a new and useful Improvement in Fertilizers; and I do hereby declare the following to be a full, clear, and exact description thereof.

My invention relates to fertilizers of the type containing plant-stimulating compounds of iron and it has for its object to produce fertilizers of the character indicated which shall be prepared by a simple and economical process and which shall be highly effective when applied to the soil to stimulate the growth of plants.

The process of my present invention consists, in general, in treating with sulfuric acid a material capable of reacting to form basic ferric sulfate, and then neutralizing the mixture with a calcareous material, the process being carried out in such a way that the resulting product contains a substantial proportion of basic ferric sulfate.

According to one modification of my process, I make use of blast furnace flue dust or other ferruginous flue dust as the starting material and after treating the flue dust with sulfuric acid I neutralize the acid solution with blast furnace slag, preferably in the form of granulated slag, produced by quenching molten slag in water. The material produced in this way contains not only basic ferric sulfate but the constituents of blast furnace slag, which themselves have fertilizing properties and have heretofore been used as fertilizer. If, in addition, the slag employed is basic slag or Thomas slag, the fertilizer also contains a substantial amount of phosphorus in a form available as plant food.

While my invention is not restricted to the use of flue dust and blast furnace slag, I prefer ordinarily to use these materials because they are already in a finely divided condition suitable for use without grinding or other treatment, and in addition they are waste products of metallurgical operations and therefore cost nothing except the expense of handling.

The material may be made by dissolving blast furnace flue dust in dilute sulfuric acid using 60 deg. Baumé acid in the proportion of one part acid and one part water, adding to this about 1½ parts of flue dust, all by weight, and dissolving same either hot or cold. After this, about eight parts of water are added and the liquor is neutralized by slowly adding 2½ parts of granulated blast furnace slag. This will produce a stiff putty-like mass which is dried and ground to the desired fineness and the material is ready for use.

The material prepared according to the method just described contains the following ingredients in substantially the proportions indicated:

Basic ferric sulfate, $Fe_4O(SO_4)_5$ __ 41.55%
Calcium oxid _____ 21.83%
Phosphorus _____ .070%
Silica_____ 19.45%
Moisture at 100° C_____ 5.97%
Combined water _____ 5.77%
Acidity as sulfuric acid_____ .98%
(Phenolphthalein) alumina_____ 6.05%

The ingredient of this fertilizer which has the most pronounced fertilizing effect is the basic ferric sulfate, which constitutes over 40% of the total product. The lime and phosphorus also have a beneficial effect. The fertilizer is applied to the soil in the same way as ordinary commercial fertilizers, either alone or mixed with other fertilizing or soil-conditioning material.

With proper manipulation this mixture can also be made to produce a ferric hydrate useful for the purification of artificial gas by removal of the hydrogen sulfid.

Iron ore, either oxid or carbonate, may be employed instead of flue dust as a starting material, in which case the ore must be ground to suitable fineness before being treated with the sulfuric acid. Other iron-containing materials are also suitable for use in my process, provided that they are capable of reacting with sulfuric acid to form sufficient amounts of basic ferric sulfate. The neutralizing agent may consist of various materials other than blast furnace slag, and limestone, dolomite, or even slaked lime are suitable for this purpose. These materials, however, are more expensive than granulated slag and require preliminary grinding before being used. For these reasons, and also because the slag already contains a considerable amount of fertilizing material, I prefer to use granulated slag instead of the other materials mentioned.

The expression "residual constituents of blast furnace slag", as used in the following claims, is intended to refer to the slag constituents which remain after the slag is used in precipitating basic ferric sulfate from iron solutions.

The proportions mentioned above may be varied within considerable limits, the principal requirement being that the reactions shall be carried out in such a way as to produce a substantial amount of basic ferric sulfate. It is also to be understood that various changes may be made in the manipulations mentioned above without departing from my invention, which is limited only by the scope of the appended claims.

I claim as my invention:

1. The process that comprises dissolving iron oxid in sulfuric acid and substantially neutralizing the solution with granulated blast furnace slag.

2. The process that comprises dissolving blast furnace flue dust in sulfuric acid and substantially neutralizing the solution with granulated blast furnace slag.

3. The process of making fertilizer that comprises treating with sulfuric acid a material capable of reacting to produce basic ferric sulfate and at least partially neutralizing the resulting mixture with calcareous material.

4. The process of making fertilizer that comprises dissolving ferruginous flue dust in sulfuric acid and at least partially neutralizing the solution with calcareous material.

5. The process of making fertilizer that comprises dissolving ferruginous flue dust in sulfuric acid and at least partially neutralizing the solution with blast furnace slag.

6. The process of making fertilizer that comprises dissolving ferruginous flue dust in sulfuric acid and at least partially neutralizing the solution with granulated blast furnace slag.

7. The process of making fertilizer that comprises dissolving ferruginous flue dust in sulfuric acid and adding sufficient calcareous material to produce a substantial amount of basic ferric sulfate.

8. The process of making fertilizer that comprises dissolving ferruginous material in sulfuric acid and adding granulated blast furnace slag so as to produce a substantial amount of basic ferric sulfate.

9. The process of making fertilizer that comprises dissolving blast furnace flue dust in sulfuric acid and adding granulated blast furnace slag so as to produce a substantial amount of basic ferric sulfate.

10. The process of making fertilizer that comprises dissolving $1\frac{1}{2}$ parts by weight of blast furnace flue dust in about one part of commercial sulfuric acid of 60° Baumé diluted with about one part of water, and adding about $2\frac{1}{2}$ parts of granulated blast furnace slag.

11. A fertilizer containing a substantial portion of basic ferric sulfate in precipitated mixture with constituents of blast furnace slag.

12. A fertilizer containing a substantial portion of basic ferric sulfate together with residual constituents of blast furnace slag.

13. A fertilizer containing, by analysis, approximately 40% of basic ferric sulfate, approximately 20% of calcium oxid, approximately 20% of silica, and approximately 6% of alumina.

14. A fertilizer containing, by analysis, approximately 40% of basic ferric sulfate, approximately 20% of calcium oxid, approximately 20% of silica, approximately 6% of alumina, and a measurable quantity of phosphorus.

In testimony whereof, I the said JOSEPH C. HECKMAN have hereunto set my hand.

JOSEPH C. HECKMAN.

Witnesses:
R. D. BROWN,
JOHN F. WILL.